L. POETON.
EYEGLASSES.
APPLICATION FILED OCT. 21, 1911.
1,038,649. Patented Sept. 17, 1912.
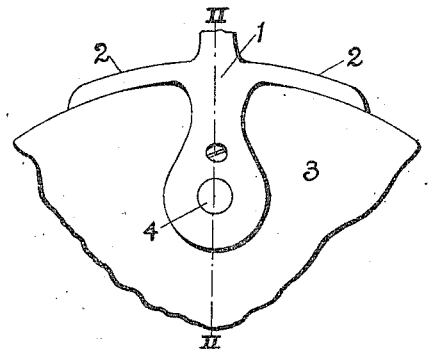
FIG. I
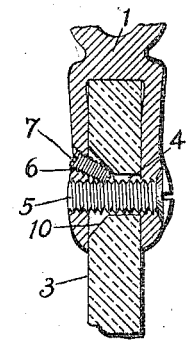
FIG. VIII
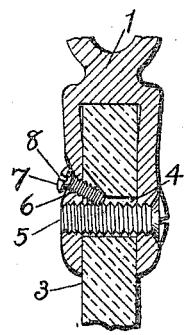
FIG. II
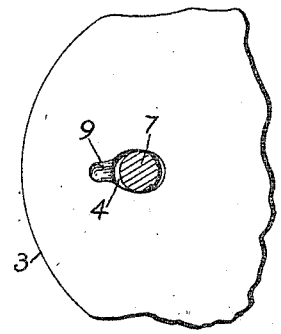
FIG. VII
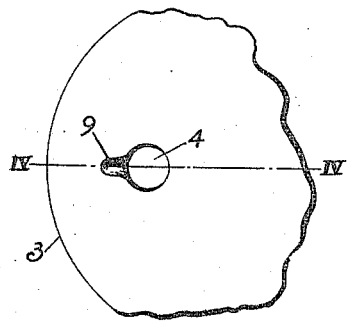
FIG. III
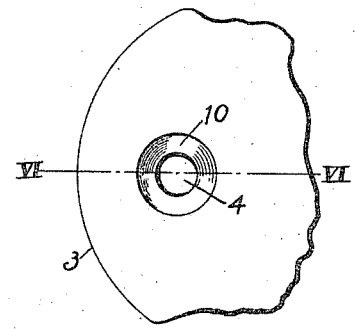
FIG. V
FIG. IV
FIG. VI
WITNESSES:
Joseph J. Demers
Reginald H. Waters
INVENTOR
L. POETON
H. H. Styll H. H. Parsons
ATTORNEY

UNITED STATES PATENT OFFICE.

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES.

1,038,649.   Specification of Letters Patent.   Patented Sept. 17, 1912.

Application filed October 21, 1911. Serial No. 655,875.

*To all whom it may concern:*

Be it known that I, LAWRENCE POETON, a citizen of the United States, residing at Southbridge, in the county of Worcester and State of Massachusetts, have invented certain new and useful Improvements in Eyeglasses, of which the following is a specification.

My invention relates to improvements in lens attachments, and has for its object the provision of an improved lens clip provided with means for satisfactorily securing the lens screw in position to prevent accidental loosening of the said lens screw while permitting of its ready withdrawal when desired.

The further object of my invention is the provision of a lens clip equipped with means which shall serve both to lock the lens screw against accidental withdrawal and also serve to force the lens into tight engagement with the strap portion of the lens clip and hold the lens against said strap to make such tight engagement between said parts as to absolutely prevent rocking of the lens relative to its mounting.

Another object of my invention is the provision of a lens formed with a novel form of screw receiving aperture particularly adapted for use in connection with my improved lens attaching device.

Other objects and advantages of my improved lens attachment will be readily apparent by reference to the following description taken in connection with the accompanying drawings, and it will be understood that I may make any modifications in the specific structure shown and described within the scope of the appended claims without departing from or exceeding the spirit of my invention.

Figure I represents a view of a lens attachment embodying my invention. Fig. II represents a sectional view on the line II—II of Fig. I. Fig. III represents a fragmentary view of one form of lens for use in connection with my attachment. Fig. IV represents a sectional view on the line IV—IV of Fig. III. Fig. V represents a fragmentary view of a slightly modified construction of lens. Fig. VI represents a sectional view on the line VI—VI of Fig. V. Fig. VII represents another fragmentary view of a lens illustrating a still further modification with a lens screw shown in position in the screw receiving aperture, and Fig. VIII represents a sectional view similar to Fig. II but illustrating slight structural modifications.

In the drawings, in which similar characters of reference are employed to denote corresponding parts throughout the several views, the numeral 1 designates an ordinary lens clip having the straps 2 extending upwardly and downwardly therefrom, the arms of the clip spanning the lens 3 which may be of any desired type. Said lens 3 has formed therethrough the orifice 4 to receive the ordinary lens screw 5 which passes transversely of the clip to connect the arms of the clip and clamp the same against the end of the lens 3. Ordinarily these parts constitute the entire lens attachment, but in my invention I have formed in one of the arms of the lens clip the diagonally transversely extending threaded passage 6 which is preferably considerably smaller than the lens screw receiving orifice, and engaged in the said passage 6 is my improved locking screw 7 having the screw driver engaging slot 8 formed in its outer end, said screw being formed either with or without a head as may prove most ornamental in the mounting.

By reference particularly to Fig. II, it will be seen that when the screw 7 is in position its inner end bites against the threads of the lens screw 5 and thus serves to hold the lens screw in position and prevent loosening thereof, a slight loosening of the said lock screw, however, disengaging it from the lens screw to permit of withdrawal of the latter. It is the object of my invention, however, to not only lock the lens screw in position but also to force the lens into more tight engagement with the strap portions of the clip than can ordinarily be attained when merely a lens screw is employed. To obtain this result in the forms shown in Figs. III and VII, I have formed at the inner edge of the lens screw receiving orifice 4 of the lens, that is at that edge nearest the strap, the inclined recess 9 which is disposed at such an angle as to slightly converge toward the side of the screw 7, whereby as said screw 7 is tightened it will ride against the inclined or beveled lower face of the notch or recess 9 and will tend to cam the lens inward into tight engagement with the straps of the mounting, the orifice 4 being sufficiently large to permit of this slight shifting of the lens relative to the lens screw.

In Fig. V and VI, I have illustrated a still further modification of the invention in which in place of employing the notch or recess 9 I form the countersink 10 surrounding the orifice 4 at one end of said orifice, this countersink serving exactly the same purpose as the recess 9 but being slightly easier to form and not requiring such exactitude in its construction.

In Fig. VII, I have illustrated another slight modification in which the orifice 4 instead of being entirely round is somewhat elongated so that its sides will make close engagement with the lens screw 5, while its length will permit of inward shifting of the lens caused by forcing of the screw 7 into position.

From the foregoing description taken in connection with the accompanying drawings the construction and operation of my improved lens attachment and lens for mounting in said attachment will be readily apparent, and it will be seen that I have provided an extremely simple, efficient and practical device of this character which may be constructed at a very slight expense and which will serve both to prevent the loosening of the lens screw which occurs so frequently with the ordinary eyeglasses, and which proves so disagreeable, and which will also serve to lock the lenses against the straps of the mounting and will thus lock said lenses in position to absolutely prevent rocking thereof, which feature is of extreme importance in the case of lenses which have been fitted by prescription for a certain pupillary adjustment and whose efficiency is deranged by any drooping of the lenses occasioned by their being loose in their mountings to even the slightest degree.

I claim:

1. The combination with a lens clip, of a lens fitting therein and having an aperture formed therethrough, and means carried by the clip and engaging a wall of the aperture in the lens at an acute angle to said wall to wedge the lens in correct position within the clip.

2. The combination with a lens clip, of a lens fitting within the clip and having a portion thereof cut away to provide an inclined wall, and means carried by the clip and bearing against said inclined wall for wedging the lens within the clip.

3. The combination with a lens clip, of a lens having a countersunk lens screw receiving aperture formed therein, and means carried by the clip and engaging said countersunk portion for locking the lens in position in the clip.

4. The combination with a lens clip, of a lens mounted therein, a lens screw passing transversely of the clip and lens, and means for locking both the lens and the screw in position in the clip.

5. The combination with a lens clip, of a lens fitting therein, a lens screw, and means for wedging the lens against rocking in the clip and for also locking the lens screw in position.

6. The combination with a lens clip, of a lens fitting therein and having a beveled portion, a lens screw passing transversely of the lens and clip, and a locking screw carried by the clip and so engaging the lens and lens screw as to wedge the lens in place and bite into the threads of the lens screw to prevent accidental loosening of the lens screw.

In testimony whereof I affix my signature in presence of two witnesses.

LAWRENCE POETON.

Witnesses:
JOSEPH J. DEMERS,
REGINALD H. WATERS.